Jan. 19, 1960 P. G. BURMAN 2,921,741
NOZZLE
Filed Aug. 20, 1958
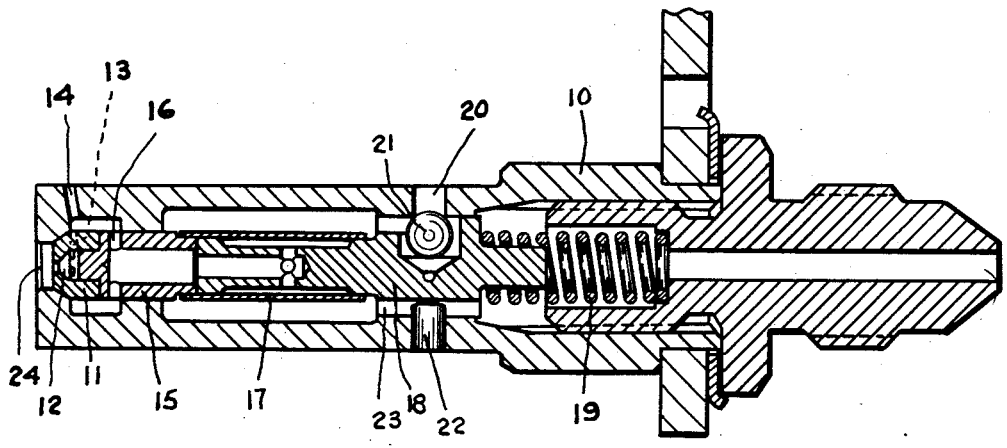
INVENTOR.
PAUL G. BURMAN
BY
ATTORNEY.

United States Patent Office 2,921,741
Patented Jan. 19, 1960

2,921,741

NOZZLE

Paul G. Burman, Longmeadow, Mass., assignor to American Bosch Arma Corporation, a corporation of New York Application August 20, 1958, Serial No. 756,231

4 Claims. (Cl. 239—111)

This invention relates to improvements in the field of igniter nozzles designed for internal combustion engines such as, for example, jet engines.

The principal object of the invention is to provide a new and improved igniter nozzle for internal combustion engines wherein means are provided for using said nozzle with a vaporizing type of burner to provide an initial highly atomized jet of fuel at a low fuel pressure for starting combustion in the combustion chamber of an internal combustion engine, such as, for example, a gasoline turbine engine, after which initial flow of fuel the main nozzles provide the fuel requirements of the engine and the igniter nozzle is shut off from the fuel source and arranged to be purged with air to keep it cool during subsequent engine operation.

Another object is to provide an arrangement of the type set forth wherein means are provided for closing the air inlet and oil escape during the flow of oil through the nozzle.

Another object is to provide a device of the type set forth wherein means are provided for preventing coking of said device and permitting the purging of the device by air after the ending of the oil flow through said device.

Another object is to provide a new and improved nozzle of the type set forth.

Other objects and advantages of the invention will be apparent from the following description taken in connection with the accompanying drawing. It will be understood that changes may be made in the details of construction and arrangement of parts shown and described, as the preferred forms have been given by way of illustration only.

Referring to the drawing:

The figure shows a longitudinal sectional view of the assembly of the igniter nozzle.

Referring more particularly to the drawings, the arrangement shown in the accompanying figure comprises a nozzle body 10 including a metering insert 11 with a conical swirl chamber 12 fed fuel by four tangential holes 13 (not further disclosed in the drawing as being in tangential relationship to chamber 12), a side jet 14 serving to ignite adjacent burners with the fuel it obtains from the holes 16 in spacer 15 and said spacer 15 serving to close off the back of said swirl chamber 12, all of said components being located at the orifice end of said nozzle body 10.

Said spacer 15 includes two or more axial and cross drilled holes 16 through which the filtered fuel flows to the metering insert 11.

The nozzle body 10 further contains tubular filter 17 fitted on one end of said spacer 15 and on filter stud 18 and spring 19 which holds metering insert 11, spacer 15 and filter stud 18 together.

Drilled hole 20 on the side of nozzle body 10 is connected to an air line or compressor (not shown) in order to keep the nozzle cool while not in operation. Ball 21 is aligned with said drilled hole 20 in nozzle body 10 through locating pin 22 engaging one of several slots 23 in filter stud 18. Said alignment of drilled hole 20 and ball check 21 is desirable in order to control the flow of air through said drilled hole 20. Thus, when the initial fuel flow is shut off, ball check 21 lifts and air passes by it and down through the lower part of nozzle body 10 and out orifice 24 of metering insert 11; and when fuel is flowing through said nozzle body 10, said ball 21 closes off drilled hole 20 thus stopping the air flow from entering nozzle body 10.

The operation of the device is similar to existing igniter nozzles subject to the aforementioned and described advantages, objects and description.

From the above, it will be seen that I have provided new and improved means for obtaining all of the objects and advantages of the invention.

I claim:

1. In a device of the character described, a nozzle body having a discharge orifice, a metering insert in said nozzle body adjacent said discharge orifice, a swirl chamber in said metering insert, a spacer member having one end extending into said metering insert, a filter stud having an end engaging the adjacent end of said spacer, said filter stud having fuel inlet ports and a filter member overlying said filter ports, resilient means retaining said filter stud in engagement with said spacer, an air passage in a wall of said nozzle body and valve means for closing said air passage when fuel is flowing through said nozzle body.

2. In a device of the character described, a nozzle body having a discharge orifice, a metering insert in said nozzle body adjacent said discharge orifice, a swirl chamber in said metering insert, a spacer member having one end extending into said metering insert, a filter stud having an end engaging the adjacent end of said spacer, said filter stud having fuel inlet ports and a filter member overlying said filter ports, resilient means retaining said filter stud in engagement with said spacer, an air passage in a wall of said nozzle body and valve means for closing said air passage when fuel is flowing through said nozzle body, said spacer having a plurality of axial and cross drilled holes through which fuel flows to said metering insert.

3. In a device of the character described, a nozzle body having a discharge orifice, a metering insert in said nozzle body adjacent said discharge orifice, a swirl chamber in said metering insert, a spacer member having one end extending into said metering insert, a filter stud having an end engaging the adjacent end of said spacer, said filter stud having fuel inlet ports and a filter member overlying said filter ports, resilient means retaining said filter stud in engagement with said spacer, an air passage in a wall of said nozzle body and valve means for closing said air passage when fuel is flowing through said nozzle body, a slot in the periphery of said filter stud and means in the wall of said nozzle body and extending into said slot for retaining said valve in alignment with said air passage.

4. In a device of the character described, a nozzle body having a discharge orifice, a metering insert in said nozzle body adjacent said discharge orifice, a swirl chamber in said metering insert, a spacer member having one end extending into said metering insert, a filter stud having an end engaging the adjacent end of said spacer, said filter stud having fuel inlet ports and a filter member overlying said filter ports, resilient means retaining said filter stud in engagement with said spacer, an air passage in a wall of said nozzle body and valve means for closing said air passage when fuel is flowing through said nozzle body, said spacer having a plurality of axial and cross drilled holes through which fuel flows to said metering insert, a slot in the periphery of said filter stud and means in the wall of said nozzle body and extending into said slot for retaining said valve in alignment with said air passage.

References Cited in the file of this patent

UNITED STATES PATENTS

| | | |
|---|---|---|
| 1,758,375 | Riehm | May 13, 1930 |

FOREIGN PATENTS

| | | |
|---|---|---|
| 27,324 | Great Britain | Nov. 27, 1912 |
| 717,562 | Great Britain | Oct. 27, 1954 |